United States Patent [19]

Hoffmann et al.

[11] 4,405,200

[45] Sep. 20, 1983

[54] RELEASABLE COUPLING FOR CONNECTING AT LEAST TWO LIGHT WAVEGUIDES

[75] Inventors: Hartmut Hoffmann, Leimen; Klaus U. Baron, Heidelberg, both of Fed. Rep. of Germany

[73] Assignee: Teldix GmbH, Heidelberg, Fed. Rep. of Germany

[21] Appl. No.: 228,239

[22] Filed: Jan. 26, 1981

[30] Foreign Application Priority Data

Jan. 24, 1980 [DE] Fed. Rep. of Germany ....... 3002473

[51] Int. Cl.³ .............................................. G02B 7/26
[52] U.S. Cl. .................................................. 350/96.21
[58] Field of Search ............... 350/96.20, 96.21, 96.22

[56] References Cited

U.S. PATENT DOCUMENTS

| 3,969,015 | 7/1976 | Le Noane | 350/96.22 |
| 4,076,379 | 2/1978 | Chouinard | 350/96.22 |
| 4,082,421 | 4/1978 | Auracher et al. | 350/96.22 |
| 4,140,366 | 2/1979 | Makuch et al. | 350/96.22 |
| 4,184,742 | 1/1980 | Corrales | 350/96.21 |
| 4,279,468 | 7/1981 | Turley et al. | 350/96.21 |

FOREIGN PATENT DOCUMENTS

| 2516662 | 7/1976 | Fed. Rep. of Germany . |
| 53-75948 | 7/1978 | Japan | 350/96.22 |

Primary Examiner—John D. Lee
Attorney, Agent, or Firm—Spencer & Kaye

[57] ABSTRACT

In a coupler for detachably placing the ends of at least two light waveguides in energy transmitting communication, which coupler is composed of two coupling halves each including a core member provided with at least one precisely positioned bore holding the end of at least one fiber of an associated conductor, a sleeve in which the core member is mounted and which is provided with at least one extension part extending axially of the sleeve, the core having a frontal end face provided with an axially extending guide pin and a guide opening diametrically opposite the guide pin, with respect to the axis of the core member, and a sleeve nut for securing the two halves of the coupler together, each coupling half includes elements supporting the core member to permit the core member to be axially movable in a resilient manner in the sleeve from an end position and to have a limited axial and radial mobility therein, the core member being in its end position when the coupling halves are uncoupled and moving axially from that end position during coupling together of the coupling halves, and structure associated with the sleeve for threadedly engaging the sleeve nut of the other coupling half in order to maintain the coupling halves coupled together, and the frontal end face of each core member is provided with a raised portion containing the end of the associated light waveguide.

16 Claims, 14 Drawing Figures

RELEASABLE COUPLING FOR CONNECTING AT LEAST TWO LIGHT WAVEGUIDES

BACKGROUND OF THE INVENTION

The present invention relates to a releasable coupling for connecting, in particular, a plurality of light waveguides, or light ways, of an optical fiber cable, the coupling being composed of two coupling halves each composed of a core member provided with at least one precisely positioned bore in which the individual light waveguides or bundles of light waveguides are inserted and fastened, a sleeve in which the core member is seated and which is provided with extensions which go beyond part of its circumference, an axially extending guide pin, a guide opening located at the frontal, or end, face of the core member and offset by 180° with respect to the guide pin, a sleeve nut for screwing together the coupling, and connecting members which cooperate with the sleeve nut. A coupling for light waveguides having the above-listed features is disclosed, for example, in German Auslegeschrift [Published Patent Application] No. 2,516,662. In that publication, the core member is rigidly mounted in the sleeve, and each sleeve includes a half shell extension, so that the two half shells of two coupled coupling halves enclose the two core members which effect the actual coupling. To complete the coupling, a third member in the form of an intermediate sleeve is required. After connecting the core members by means of the guide pins and the guide openings, the two sleeve nuts are screwed to the two ends of this intermediate sleeve.

Compared to other prior art solutions employing coupling "halves" of different designs, this prior art solution has the advantage that the sleeves as well as the core members may be of identical construction, that the pins and openings assure unequivocal association of the light waveguides and transmission losses can be kept low.

SUMMARY OF THE INVENTION

It is an object of the present invention to improve the prior art coupling, while maintaining the above-mentioned advantages, in such a manner that, firstly, a separate part, i.e. an intermediate sleeve, is no longer required and thus the coupling member and the coupling action are simplified.

A further object of the invention is to reduce the requirements for precision in the sleeves of such a coupling.

The above and other objects are achieved, according to the invention, in a coupler for detachably placing the ends of at least two light waveguides in energy transmitting communication, which coupler is composed of two coupling halves each including a core member provided with at least one precisely positioned bore holding the end of at least one fiber of an associated conductor, a sleeve in which the core member is mounted and which is provided withh at least one extension part extending axially of the sleeve, the core having a frontal end face provided with an axially extending guide pin and a guide opening diametrically opposite the guide pin, with respect to the axis of the core member, and a sleeve nut for securing the two halves of the coupler together, by providing each coupling half with means supporting the core member to permit the core member to be axially movable in a resilient manner in the sleeve from an end position and to have a limited axial and radial mobility therein, the core member being in its end position when the coupling halves are uncoupled and moving axially from that end position during coupling together of the coupling halves, and means associated with the sleeve for threadedly engaging the sleeve nut of the other coupling half in order to maintain the coupling halves coupled together, by providing the frontal end face of each core member with a raised portion containing the end of the associated light waveguide.

The present invention can be used for coupling one light waveguide, light way, or fiber, but is preferably intended for coupling together a plurality of light ways.

With the solution according to the invention, the coupling half core members to be coupled together are, in view of the manner in which they are seated, capable of performing axial, and radial, and thus also tilting, movements in the sleeves. Thus it is not necessary to require great manufacturing precision for the sleeves. High precision is required only in placing the bores for the light waveguides and for the guide openings and in attaching the guide pins. Due to the fact that the core members must be displaced against the force of a spring when they are being coupled together, it is assured with great certainty that the individual light ways will be coupled together perfectly and thus in a low loss manner. Axial displaceability of such core members against the force of a spring is known per se, for example, as disclosed in U.S. Pat. No. 4,076,379.

The perfect, and thus low loss, coupling of the individual light ways, or fibers, is further aided by the fact that the regions where the light ways end are given a raised configuration. Such a raised configuration is constituted by small raised portions having planar surfaces which project beyond the remainder of the end face of the core member. In that way, only a relatively small portion of the total surface of a core member need be provided with the required surface quality. On the other hand, the probability of dirt particles interfering with the actual coupling is greatly reduced. This is the case particularly when, according to a further feature of the invention, the locations at which the guide openings and the guide pins are provided are placed in set-back regions of the core element end face, i.e. not in raised portions thereof. Dirt particles which are brushed off the guide pin during coupling can then not reach the raised portions and can thus not interfere with the coupling. Sufficient cleansing of the end face is also facilitated because it is only important to keep the raised surfaces clean and dirt particles at the foot of a guide pin, which are more difficult to remove, cannot cause problems.

If necessary, and in order to stabilize the core members when they are connected together by means of respective guide pins, additional raised surface portions can be provided, such as for example a raised edge region of the same height as the first-mentioned raised portion.

Finally, the fact that threaded portions associated with the axial projections of the sleeve of each coupling half are utilized as members for establishing the connection with the sleeve nut of the other half, eliminates the need for a special, separately provided intermediate sleeve. As already mentioned, the advantage that the two halves to be coupled together are made of identical parts is maintained in the present invention.

A particularly advantageous embodiment of the invention results if, firstly, the light ways of a conductor are arranged on a straight line which bisects and is perpendicular to the connecting line between the guide pin and the guide opening of the same core member and, secondly, the light way ends are disposed in symmetry with the connecting line. Then both coupling halves are completely identical and a light way, or fiber, end disposed at a certain point in one coupling half is coupled with the light way, or fiber, end disposed at the same place in the other half, i.e. the light way ends to be coupled together lie at the same place in each coupling half.

With the permissible arrangement of the light waveguide ends at any desired location in a core member of one coupling half, the core member of the other coupling half must be provided with corresponding light way receiving bores in a mirror image along the abovementioned straight line perpendicular to the connecting line. If, however, the bores in one core member are arranged symmetrically with respect to the associated straight line, the bores in all core members are identical and only the guide pin and the guide opening must be interchanged in one core member of a pair.

According to a preferred embodiment of the invention, each sleeve is provided with two axial extensions in the form of quarter cylinders which are offset by 180° with respect to each other, and the ends of these extensions are provided with an external thread of a size which mates with internal threads of the sleeve nut of the other coupling half.

In order to protect the ends of the light ways and prevent the exit of light beams in the uncoupled state, a cover may be provided for the ends of the light ways. With the above-mentioned arrangement of the light way ends on or in the vicinity of a line perpendicular to and bisecting the connecting line, this can be realized by providing the sleeve with a member which is under the effect of a spring and is axially displaceable. At least one covering strip is mounted to this member by means of a hinge in such a manner that the strip can be flipped or pivoted over the ends of the light ways and that the force of a spring acts on the strip in the sense of flipping it into position against the core member end face.

If the entire light conductor canle is to be provided with a covering hood when in the uncoupled state, this can be accomplished in that the extensions of the sleeves are designed in such a way that the development onto a plane, of the front edge of the sleeve, including its axial extensions, has the form of two cycles of a sine wave. Additionally there can be provided a semicylindrical half shell which is seated coaxially on the sleeve and covers its front edge. The half shell is constructed such that its projection onto a plane parallel to its cylindrical axis has approximately the form of a rectangle. Such half shell has such a length, and is provided with threads at such locations, that in the coupled state of two coupling halves, the threads of both sleeve nuts are in engagement with the two respective half shells. Moreover, in the region of the four corners of its outline in a plane parallel to its cylindrical axis, each half shell is rounded to correspond to the internal diameter of the sleeve nuts and is provided, at these rounded portions, with external threads which are perpendicular to the first mentioned threads and which match the threads of the sleeve nuts so that, in the uncoupled state of the coupling halves, the half shell belonging to each coupling half can be placed over the associated sinusoidal front edge of the sleeve as a covering hood and can be fastened by threaded engagement with the sleeve nut.

In the coupled state, the raised portions of the coupled core members are disposed against one another. Particularly if these raised portions are not arranged in a distributed manner over the core member end face, it is appropriate to provide supporting regions along the end face edge having the same thickness, or height, as the raised portions, e.g. to provide a raised ring around the edge of the end face.

The light ways can be inserted directly into correspondingly dimensioned bores and be fastened there, or the individual light ways can each be mounted in a respective jewel bearing, known per se, and these jewel bearings can be inserted into corresponding bores of each core member.

To relieve the light ways in the coupling halves of tension acting on their associated cable, one embodiment of the invention provides two rings in the sleeve. These rings lie next to one another, when seen in the axial direction, and are provided on their mutually facing sides, with matching oblique faces. The tension relieving material provided in the light conductive cable is guided, starting from the cable, around the ring closer to the core member and then between the two oblique faces of the rings. Thus if there is any tension on the cable, the two rings are pulled in the axial direction against an abutment associated with the sleeve and the tension relieving material becomes clamped between the rings.

DESCRIPTION OF THE PREFERRED EMBODIMENTS

Figure 1A:
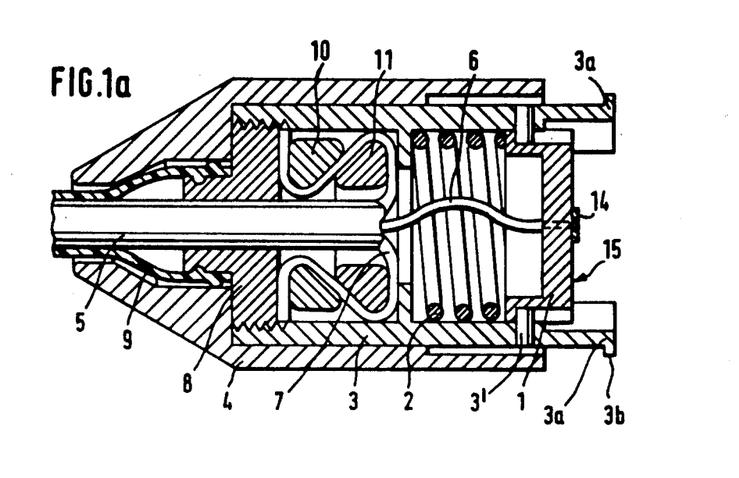
FIG. 1a is a longitudinal cross-sectional view of a first preferred embodiment of the invention, taken along the section line of FIG. 1b.
Figure 1B:
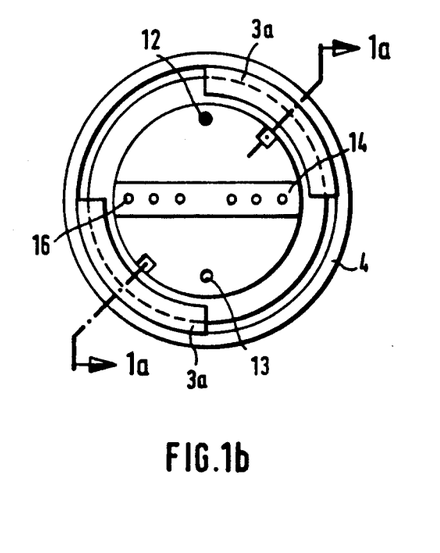
FIG. 1b is an elevational end view of the embodiment of FIG. 1a, viewing the structure of FIG. 1a from the right.

FIG. 1a is a longitudinal sectional view through an embodiment of a coupling half according to the invention and FIG. 1b is an end view of the frontal face of the coupling half.

The coupling half is composed of a core member 1, a spring 2, a sleeve 3, and a sleeve nut 4. The coupling half holds the end of a light conductor cable 5, one optical fiber 6 of which is shown in FIG. 1a. The conductor cable includes a sleeve 7, which serves to relieve stress on fibers 6 and which is inserted into a receptacle 8 of the coupling half, and a conduit, or sheath, 9 which may be composed of a metal braid and which is secured around a nipple forming part of receptacle 8. Within sleeve 3 there are disposed two locking rings 10 and 11 around which sleeve 7 extends so as to be locked in place.

The exterior end face 15 of core member 1 carries a guide pin 12 and a raised portion 14 provided with bores through which extend the ends 16 of fibers 6. End face 15 is further provided with a guide opening 13 located diametrically opposite pin 12.

The core member 1, in whose bores the ends of light waveguides, or fibers, 6 are fastened, is held in sleeve 3 by retaining pins 3' and is axially movable within the sleeve 3 against a restoring force provided by spring 2. Since there is also a possibility for core 1 to experience a certain radial movement, it is also capable of tilting.

The sleeve 3 is provided with two axial extensions in the form of two quarter circles 3a which are diametrically opposed, or offset by 180° with respect to each other, and are provided with threads 3b at their ends. When two such coupling halves, or members, are coupled together, the pin 12 of one half engages in the guide opening 13 of the counterpart, and the guide pin 12 of the counterpart enters into opening 13 of the one half. Additionally, the quarter circles 3a of the counterpart come to lie between the quarter circles 3a of the one half.

Pin 12 can be given a pointed or possibly rounded configuration, and opening 13 a somewhat conical configuration, which cooperate with the radial mobility of the core members 1 to facilitate coupling. Specifically, the radial mobility of the core members 1 and the particular shape of the guide pins and bores can be matched to one another in such a way that there occurs a preliminary guidance which finally aligns the parts so well with one another that the highly precise guidance between pin and bore at the end of the guidance which is necessary to obtain the optimum coupling efficiency is effected without jamming. Once the corresponding raised portions 14 come to lie on top of one another, the core members 1 are displaced axially and the thread of the extensions 3a on the counterpart come into alignment with the thread of the sleeve nut 4 of the one part so that the two parts can be screwed together with the extensions 3a of each half being screwed into the sleeve nut 4 of the other half.

The raised portion 14 is here designed as a strip 14 in which seven light fibers end. These lie on a diametrical line midway between, and perpendicular to a line connecting, the pin 12 and the opening 13. This arrangement of the ends of the light fibers assures that in spite of the completely identical design of all parts of the coupling halves, corresponding conductor, or fiber, ends will be coupled together, as for example the conductor ends disposed in the far left of both coupling halves.

The cable 5 and its sheath 9 are held in place in the receptacle member 8. The two rings 10 and 11 have superposed oblique faces and act to relieve tension on the cable and to protect the conductors, or fibers, 6. The stress relieving material 7 of the cable 5 is wound around the rings in such a manner that the material comes to lie between the oblique faces of the rings. When there is tension in the cable, the rings 10, 11 will therefore be pulled against the receptacle member 8 via the material 7 and the material will thus be clamped in between the rings.

Figure 2A:
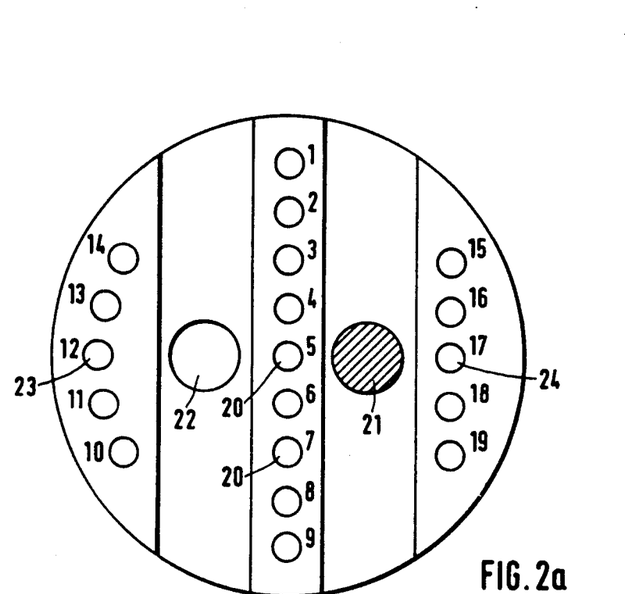
FIGS. 2a and 2b are elevational end views of two coupling halves which are to be connected together.
Figure 2B:
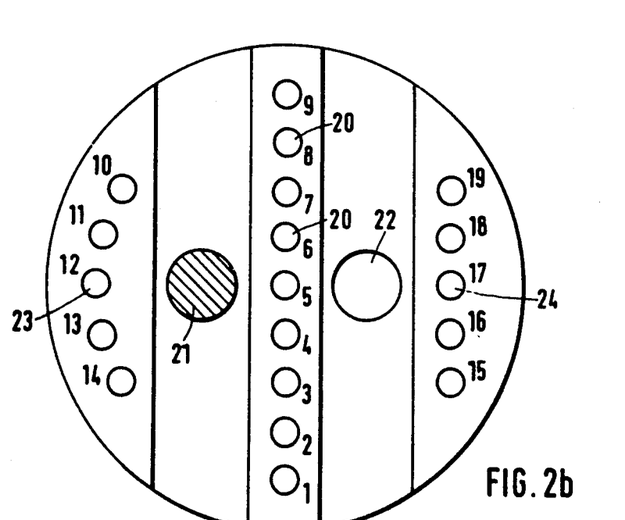

FIGS. 2a and 2b show the frontal end faces of the core members of two coupling halves, or members, to be coupled together. These coupling members contain, in addition to the conductors, or fibers, 20 ending on a diametrical line perpendicular to the line between guide pin 21 and guide opening 22, further conductor ends 23 and 24 which are also arranged on raised portions symmetrically with respect to the connecting line between pin 21 and opening 22. It can be seen that the bores receiving the fiber ends in both halves are arranged identically but that pin 21 and opening 22 must be interchanged in the two halves. It can also be seen that the opening 22 and the pin 21 are disposed in nonraised regions.

Figure 3A:
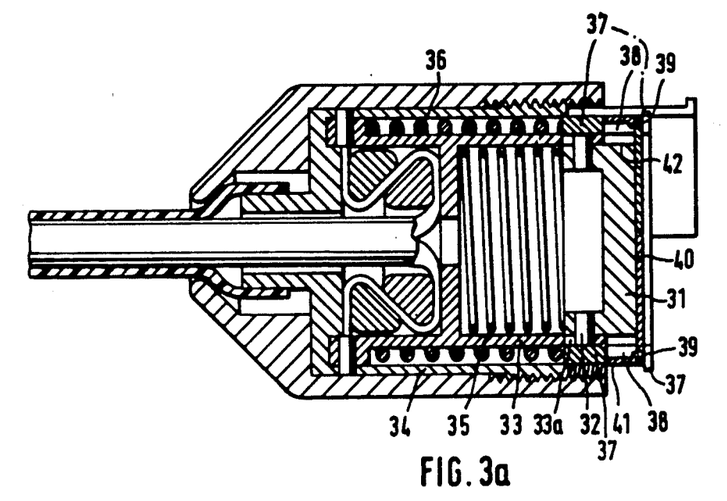
FIGS. 3a and 3b are views similar to FIGS. 1a and 1b of a further embodiment of the invention (FIG. 3c being part of FIG. 3a).
Figure 3B:
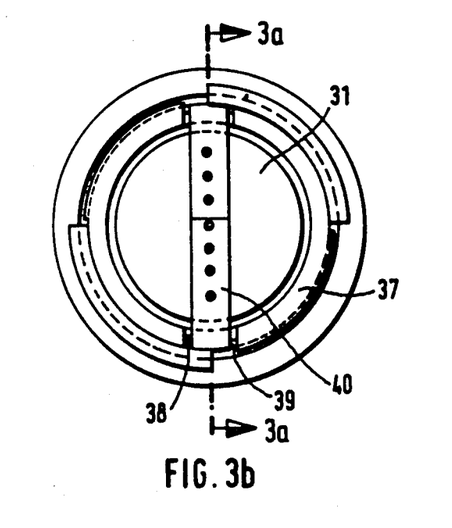
Figure 3C:
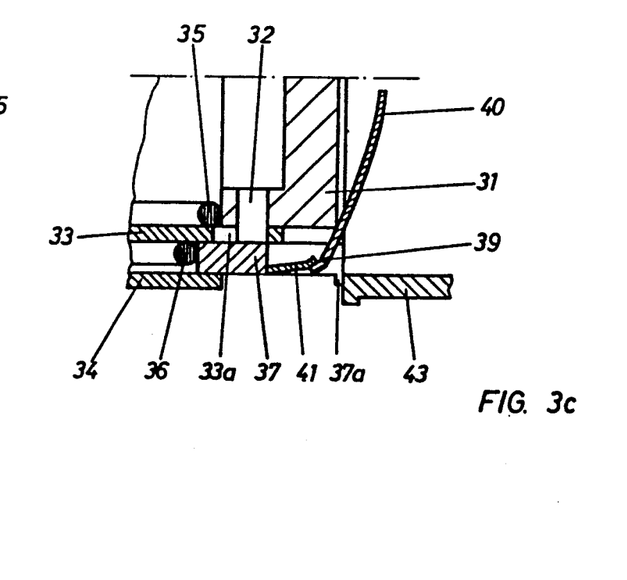

FIG. 3a shows a longitudinal cross-sectional view of a somewhat different embodiment than that of FIG. 1, FIG. 3b is an end view thereof, and FIG. 3c is a detail view of FIG. 3a.

The core member 31 is here secured against rotation relative to sleeve 33, 34 by mounting pins 32 in long holes 33a in the sleeve 33, 34 and is held in the illustrated position by means of a spring 35. A ring 37 which can be displaced against the force of a second spring 36 is disposed at the right end of the two sleeve members 33 and 34 and is provided with two radial cuts, or gaps, 38. A flexible metal strip 40 is fastened in each one of these cuts to ring 37 by means of a thin bar 39. Thin metal parts 41 are connected with ring 37 and have their front ends bent slightly; the spring 36 places via the parts 41 the metal strips 40 into the illustrated position when the coupling is uncoupled; thus the ends of the light conductors are covered. If a coupling is to be made, the ring 37 is pressed to the left by the quartercircle axial extensions of the other half so that the strips 40 are deflected outwardly over the edges 42 of the core member 31 and are moved partially into the annular area between the sleeve members 33 and 34. The short end of the strips 40, when seen from the bar 39, is then partly clamped behind the member 41 which acts as a leaf spring.

In FIG. 3c parts 31–41 of the lower side of FIG. 3a are shown in an enlarged view; furthermore in this figure the quartercircle axial extension 43 of the other half of the coupling is just moving the parts 37, 40 and 41 to the left via nose 37a of ring 37.

In the embodiment shown in FIGS. 4a–4d, the axial extensions of sleeve 50 are designed in such a manner that a developed form of the cylinder defining sleeve 50 would have the form of a double sine wave at the right-hand edge. In the drawing, the sleeve edge portions projecting farthest to the right, constituting the axial extensions, are marked 51; the other edge portions are recessed as indicated by boundary line 52. Between sleeve 50 and sleeve nut 53 there is provided a half shell shaped coupling member 54 which is equipped with an external thread 55 over its full length and threadedly engaged with the sleevve nut. After coupling of two such coupling halves, both sleeve nuts 53 are connected with both half shells 54.

Figure 4A:
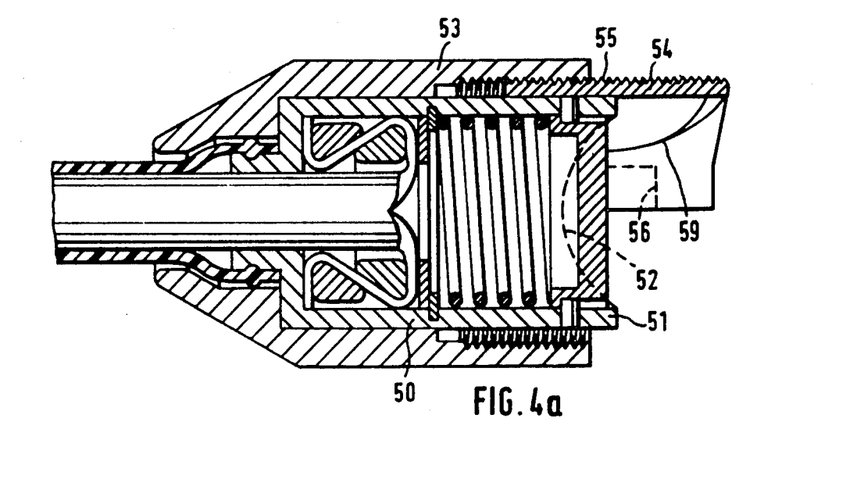
FIGS. 4a and 4b are views similar to FIGS. 1a and 1b of another embodiment of the invention.
Figure 4B:
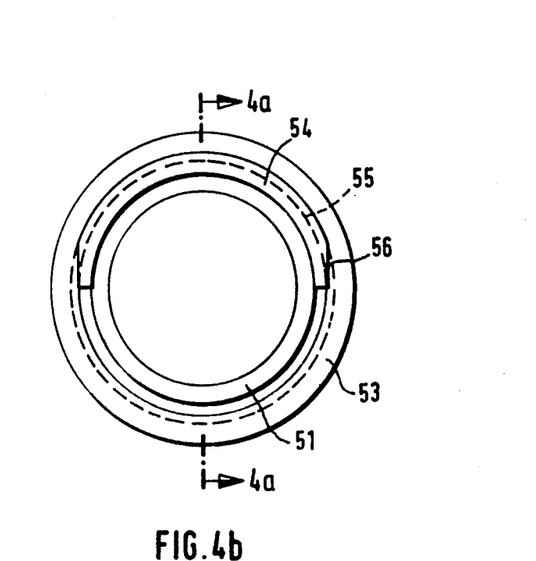

As shown in FIGS. 4a and 4b, the half shell 54 is thinner along its edges 56, where it has no thread.

In the decoupled state, the half shell 54 serves as a covering flap for its associated coupling half. For this purpose, it is separated from the sleeve nut and, starting from the position shown in FIG. 4a, is pivoted downwardly over the projecting edges 51.

Figure 4C:
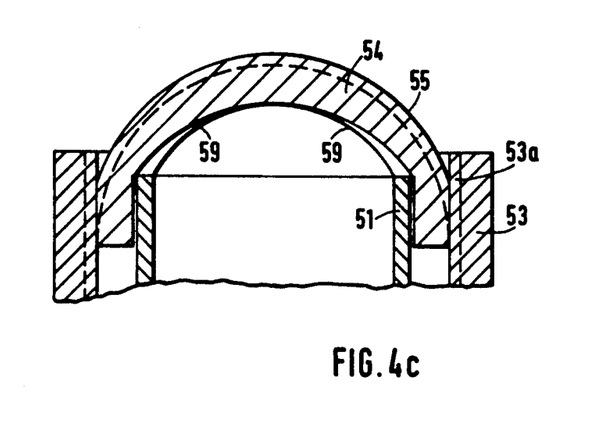
FIG. 4c is a cross-sectional detail view, taken along an axial plane perpendicular to the plane of FIG. 4a, showing one component in a moved position.
Figure 4D:
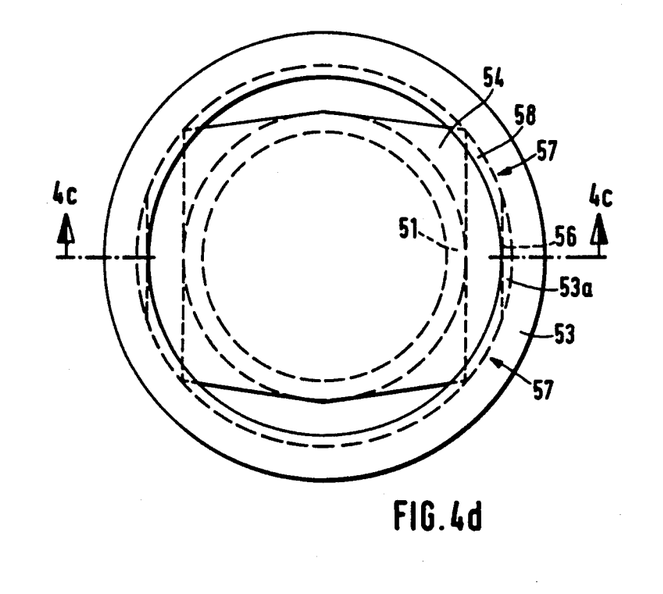
FIG. 4d is an axial end view of the arrangement of FIG. 4c, with certain hidden boundary lines shown by broken lines.

FIG. 4c shows in a cross-sectional view the front edge 51 of the sleeve 50 of FIG. 4a turned by 90° compared with FIG. 4a about the longitudinal axis, with the coupling half pivoted so that its free end points upwardly, as well as the right-hand edge of the sleeve nut 53 and the coupling member 54 which has now been placed as a cap. It can be seen, particularly in FIG. 4d, which is a top view of the arrangement of FIG. 4c, that member 54 is not only thinner and free of threads at the edges 56, but is aditionally rounded at its corners 57 and there provided with external threading 58 in such a manner that this external threading mates with the thread in the sleeve nut 53; i.e. the member 54 can be screwed into nut 53 in two different positions which are offset from one another by 90°, for which purpose member 54 is provided with two different sets of threads.

The above-described cap 54 would merely rest on the outer edge of the projections 51 and not on the total frontal face of the projections 51. This can be changed by providing a correspondingly shaped raised portion on the inner face of member 54 along the line of contact of the projections 51 with the hood 54, which raised portion effects a planar contact between members 54 and 51. This is indicated by lines 59 in FIGS. 4a and 4c.

Figure 4E:
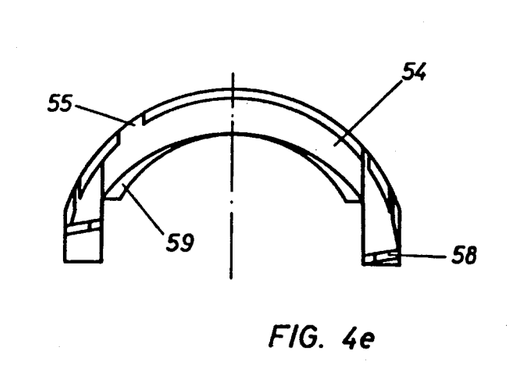
FIGS. 4e–g show a component of FIGS. 4a–4d in three different views.
Figure 4F:
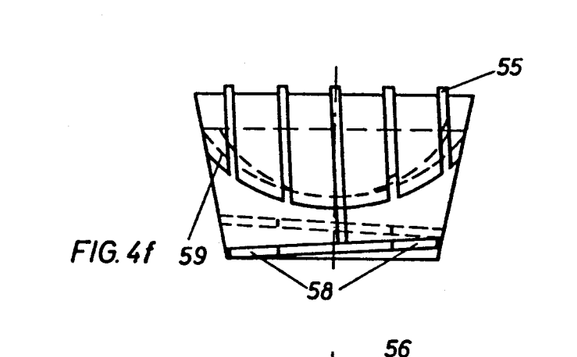
Figure 4G:
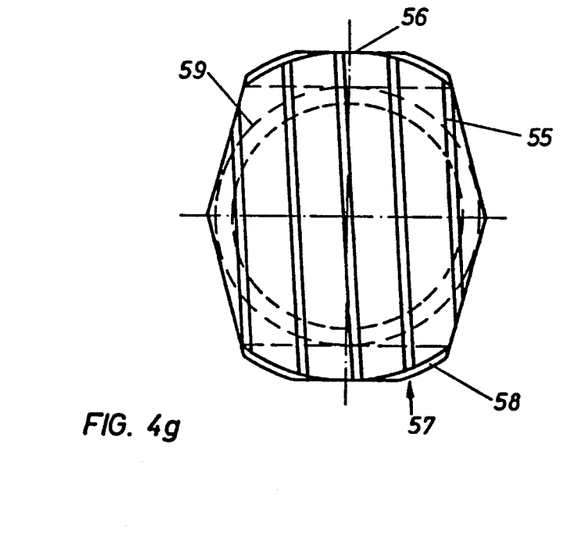

In FIGS. 4e-g cap 54 is shown in three different views (FIG. 4e front view, FIG. 4f side-view and FIG. 4g axial end view). It can be seen that the two coarse threads 55 and 58 are perpendicular to one another, that the thread 55 is partially (56) cut away, and that the thread 58 is only provided at the four corners 57.

If one of the described coupling halves is provided with a flange, this half can be used as the entering of the housing of a device. The diodes for coupling in and out can then be accommodated in this coupling half.

In order to be able to immediately distinguish different coupling halves, different couplings can be equipped with different extensions, e.g. two quarter shells, one half shell, two shell members each disposed on a respective coupling half and having respectively different widths. A further way of distinguishing can be provided by shifting the line extending between the guide pin and the guide opening with respect to the axial extension or extensions, respectively.

It will be understood that the above description of the present invention is susceptible to various modifications, changes and adaptations, and the same are intended to be comprehended within the meaning and range of equivalents of the appended claims.

What is claimed is:

1. In a coupler for detachably placing the ends of at least two light waveguides in energy transmitting communication, which coupler is composed of two coupling halves each including a core member provided with at least two precisely positioned bores holding the ends of at least two optical fibers of an associated waveguide, a sleeve in which the core member is mounted and which is provided with at least one extension part extending axially of the sleeve, the core member having a frontal end face provided with an axially extending guide pin and a guide opening diametrically opposite the guide pin, with respect to the axis of the core member, and a sleeve nut for securing the two halves of the coupler together, the improvement wherein each said coupling half further comprises: means supporting said core member to permit said core member to be axially movable in a resilient manner in said sleeve from an end position and to have a limited axial and radial mobility therein, said core member being in its end position when said coupling halves are uncoupled and moving axially from that end position during coupling together of said coupling halves; and means associated with said sleeve for threadedly engaging said sleeve nut of the other said coupling half in order to maintain said coupling halves coupled together; and wherein said frontal end face of each said core member includes a raised portion containing the ends of the associated optical fibers, the ends of the associated optical fibers are arranged in said raised portion of each said core member along a straight line perpendicular to and bisecting the line between said guide pin and guide opening provided at said core member end face, said guide pin and said guide opening provided at said end face of each said core member are located outside of said raised portion thereof, and said guide pin provided at each said core member end face has a conical portion in the vicinity of its tip and has the form of a dowel pin in the vicinity of its base.

2. An arrangement as defined in claim 1 wherein said means supporting said core member of each said coupling half comprise a spring element urging said core member into said end position.

3. An arrangement as defined in claim 2 wherein said optical fiber ends are disposed symmetrically with respect to said line extending between said guide pin and guide opening.

4. An arrangement as defined in claim 3 wherein, in each said coupling half, said core member holds a plurality of further optical fibers of the associated light waveguide at regions of said end face spaced from said raised portion, in a symmetrical arrangement with respect to the line extending between said guide pin and guide opening, and said further optical fibers of each waveguide are disposed in said core member of each said coupling half such that when said coupling halves are coupled together, each further fiber of one waveguide is aligned with a corresponding further fiber of the other waveguide.

5. An arrrangement as defined in claim 3 wherein each said coupling half is provided with two said extension parts diametrically opposite one another, with respect to the axis of said sleeve, each covering one-fourth of the circumference of said sleeve and each provided with an external thread constituting said means for threadedly engaging said sleeve nut of the other said coupling half.

6. An arrangement as defined in claim 5 further comprising: a component mounted for movement relative to said core member in the axial direction of said sleeve; means defining a covering strip dimensioned for covering said ends of said several fibers when said coupling halves are uncoupled; hinge means connecting said means defining a covering strip to said component for causing said strip to move between a position in which it covers said fiber ends to a position in which it exposes said fiber ends as said component moves in the axial direction between two end positions; and spring means urging said component into that end position where said strip covers said fiber ends.

7. An arrangement as defined in claim 1 wherein, in each said coupling half, said core member holds a plurality of further optical fibers of the associated light waveguide at regions of said end face spaced from said raised portion, in a symmetrical arrangement with respect to the line extending between said guide pin and guide opening, and said further optical fibers of each waveguide are disposed in said core member of each said coupling half such that when said coupling halves are coupled together, each further fiber of one waveguide is aligned with a corresponding further fiber of the other waveguide.

8. An arrangement as defined in claim 1 wherein the end of said sleeve at which said at least one extension part is provided has the form of two cycles of a sine wave presenting two peaks spaced 180° apart around the circumference of said sleeve and defining two said extension parts; said means associated with said sleeve comprise a connecting member having a semicylindrical form, said connecting member having a first set of threads extending around its cylindrical circumference and having a length in the direction of its cylindrical axis to threadedly engage said sleeve nuts of both said coupling halves when they are coupled together, said connecting member being further rounded to have edge portions which lie on a circular cylinder that has an axis perpendicular to the axis of the semicylinder defining the form of said connecting member, the diameter of the circular cylinder corresponding to that of said sleeve nut and said edge portions being provided with a second set of threads perpendicular to said first set of threads to threadedly engage said sleeve nut in such a manner that said connecting member covers said optical fiber ends.

9. An arrangement as defined in claim 1 wherein said frontal end face of each said core member further includes a raised edge portion containing the end of at least one further associated optical fiber.

10. An arrangement as defined in claim 9 wherein said raised edge portion has the form of a ring.

11. An arrangement as defined in claim 1 wherein said core member is provided with a plurality of such bores each larger in diameter than an associated optical fiber, and comprises a plurality of jewel bearings each inserted in a respective bore and holding an associated optical fiber end.

12. An arrangement as defined in claim 1 wherein each light waveguide includes a stress relieving sleeve surrounding the optical fibers of that conductor, and further comprising, in each said coupling half, two holding rings disposed in said sleeve in an axial spaced relationship and each having a face which is oblique to the axis of said sleeve, said oblique faces being parallel to one another, said rings being arranged to receive the stress relieving sleeve of the associated waveguide between their respective oblique faces in a manner to cause any tension on the waveguide to produce a force pressing said rings together and clamping the sleeve therebetween.

13. An arrangement as defined in claim 1 wherein said guide pin has a rounded tip.

14. An arrangement as defined in claim 1 wherein said guide opening has a conical portion in the vicinity of its upper edge and is configured to effect precise guidance of said guide pin of the other said coupling half only in the vicinity of the bottom of said guide opening.

15. In a coupler for detachably placing the ends of at least two light waveguides in energy transmitting communication, which coupler is composed of two coupling halves each including a core member provided with at least two precisely positioned bores holding the ends of at least two optical fibers of an associated waveguide, a sleeve in which the core member is mounted and which is provided with at least one extension part extending axially of the sleeve, the core member having a frontal end face provided with an axially extending guide pin and a guide opening diametrically opposite the guide pin, with respect to the axis of the core member, and a sleeve nut for securing the two halves of the coupler together, the improvement wherein each said coupling half further comprises: means comprising a spring element supporting said core member for urging said core member in an end position and for permitting said core member to be axially movable in a resilient manner in said sleeve from the end position and to have a limited axial and radial mobility therein, said core member being in its end position when said coupling halves are uncoupled and moving axially from that end position during coupling together of said coupling halves; and means associated with said sleeve for threadedly engaging said sleeve nut of the other said coupling half in order to maintain said coupling halves coupled together; and wherein said frontal end face of each said core member includes a raised portion containing the ends of the associated optical fibers, with said optical fiber ends being arranged in a straight line in said raised portion at said end face of said core, which line is perpendicular to and bisects the line extending between said guide pin and guide opening provided at said core end face, each said coupling half is provided with two said extension parts diametrically opposite one another, with respect to the axis of said sleeve, each covering one-fourth of the circumference of said sleeve and each provided with an external thread constituting said means for threadedly engaging said sleeve nut of the other said coupling half, and wherein each said coupling half further comprises: a component mounted for movement relative to said core member in the axial direction of said sleeve; means defining a covering strip dimensioned for covering said ends of said optical fibers held by said core member when said coupling halves are uncoupled; hinge means connecting said means defining a covering strip to said component for causing said strip to move between a position in which it covers said fiber ends to a position in which it exposes said fiber ends as said component moves in the axial direction between two end positions; and spring means urging said component into that end position where said strip covers said fiber ends.

16. In a coupler for detachably placing the ends of at least two light waveguides in energy transmitting communication, which coupler is composed of two coupling halves each including a core member provided with at least one precisely positioned bore holding the end of at least one optical fiber of an associated waveguide, a sleeve in which the core member is mounted and which is provided with at least one extension part extending axially of the sleeve, the core member having a frontal end face provided with an axially extending guide pin and a guide opening diametrically opposite the guide pin, with respect to the axis of the core member, and a sleeve nut for securing the two halves of the coupler together, the improvement wherein each said coupling half further comprises: means supporting said core member to permit said core member to be axially movable in a resilient manner in said sleeve from an end position and to have a limited axial and radial mobility therein, said core member being in its end position when said coupling halves are uncoupled and moving axially from that end position during coupling together of said coupling halves; and means associated with said sleeve for threadedly engaging said sleeve nut of the other said coupling half in order to maintain said coupling halves coupled together; and wherein said frontal end face of each said core member includes a raised portion containing the end of the associated optical fiber; and further wherein, in each said coupling half: the end of said sleeve at which said at least one extension part is provided has the form of two cycles of a sine wave presenting two peaks spaced 180° apart around the circumference of said sleeve and defining two said extension parts; said means associated with said sleeve comprise a connecting member having a semicylindrical form, said connecting member having a first set of threads extending around its cylindrical circumference and having a length in the direction of its cylindrical axis to threadedly engage said sleeve nuts of both said coupling halves when they are coupled together, said connecting member being further rounded to have edge portions which lie on a circular cylinder that has an axis perpendicular to the axis of the semicylinder defining the form of said connecting member, the diameter of the circular cylinder corresponding to that of said sleeve nut and said edge portions being provided with a second set of threads perpendicular to said first set of threads to threadedly engage said sleeve nut in such a manner that said connecting member covers said optical fiber end.

* * * * *